US010302259B2

(12) United States Patent
Heilbrun

(10) Patent No.: US 10,302,259 B2
(45) Date of Patent: May 28, 2019

(54) LOW VOLTAGE LIGHTING SYSTEM FOR USE DURING POWER OUTAGES

(71) Applicant: WE TURN YOUR LIGHTS ON, INC., Monroe, NY (US)

(72) Inventor: Eliezer Heilbrun, Monroe, NY (US)

(73) Assignee: WE TURN YOUR LIGHTS ON, INC., Monroe, NY (US)

( * ) Notice: Subject to any disclaimer, the term of this patent is extended or adjusted under 35 U.S.C. 154(b) by 89 days.

(21) Appl. No.: 15/267,542

(22) Filed: Sep. 16, 2016

(65) Prior Publication Data

US 2017/0082250 A1 Mar. 23, 2017

Related U.S. Application Data

(60) Provisional application No. 62/221,697, filed on Sep. 22, 2015.

(51) Int. Cl.

| | |
|---|---|
| ***F21L 4/02*** | (2006.01) |
| ***F21L 4/08*** | (2006.01) |
| ***H02J 7/00*** | (2006.01) |
| ***H02J 7/02*** | (2016.01) |
| ***H02J 7/35*** | (2006.01) |
| ***F21V 23/02*** | (2006.01) |
| ***F21V 23/04*** | (2006.01) |
| ***F21Y 115/10*** | (2016.01) |

(52) U.S. Cl.

CPC ........................... *F21L 4/08* (2013.01); *F21L 4/02* (2013.01); *F21V 23/02* (2013.01); *F21V 23/04* (2013.01); *F21V 23/0407* (2013.01); *H02J 7/0021* (2013.01); *H02J 7/027* (2013.01); *H02J 7/355* (2013.01); *F21Y 2115/10* (2016.08)

(58) Field of Classification Search

None

See application file for complete search history.

(56) References Cited

U.S. PATENT DOCUMENTS

| | | | | |
|---|---|---|---|---|
| D624,876 | S * | 10/2010 | Daniels | D13/107 |
| 8,080,972 | B2 * | 12/2011 | Smith | H02J 7/35 320/101 |
| 9,182,088 | B2 * | 11/2015 | Workman | F21L 4/02 |
| 9,385,351 | B2 * | 7/2016 | Workman | H01M 2/204 |
| D773,992 | S * | 12/2016 | Krantz | D13/110 |
| 2001/0043052 | A1 * | 11/2001 | Griffey | H02J 7/0042 320/114 |
| 2010/0213892 | A1 * | 8/2010 | DeSanctis | H01R 25/006 320/107 |
| 2012/0025766 | A1 * | 2/2012 | Reade | H02J 7/0042 320/110 |
| 2013/0043826 | A1 * | 2/2013 | Workman | H01M 2/0245 320/101 |

* cited by examiner

*Primary Examiner* — Britt D Hanley

(74) *Attorney, Agent, or Firm* — Ostrolenk Faber LLP

(57) ABSTRACT

A low voltage DC lighting apparatus is provided as a generally rectangular or cube-shaped housing including one or more low-voltage DC lights at the housing, one or more on/off light controllers and one or more status displays. During a power outage, the low voltage apparatus can be turned on to provide lighting anywhere in a home, where needed. The housing has an AC-style power socket plug which outputs a DC voltage that can drive lower voltage, DC bulbs via a conventional AC convention cord. The internal electrical circuit of the housing has a rechargeable low voltage DC battery, a charger for the battery and DC light drivers for driving the DC light outputs.

11 Claims, 6 Drawing Sheets

LOW VOLTAGE LIGHTING SYSTEM FOR USE DURING POWER OUTAGES

CROSS-REFERENCE TO RELATED APPLICATION

This application claims benefit of and priority to U.S. Provisional Application Ser. No. 62/221,697 filed Sep. 22, 2015, the contents of which are incorporated herein by reference.

BACKGROUND OF THE INVENTION

In general, the invention is directed to a low voltage lighting system for use during power outages, and/or environments where the inherent safety of low voltages is advantageous, for example around children, in bath rooms and the like.

In general, the invention is directed to a portable, battery-based power unit and lighting system. Preferably, it is provided in a small form factor housing, preferably a cube like housing about seven inches on each side, containing a 12 volt battery, and easily carried around by its handle. During power outages or in other settings, for example camping trips, the basic unit is a lighting source that provides one or more of a strobe light, an LED light, a 12 volt DC output that can drive DC, low voltage marine style light bulb and low-voltage USB outlets for charging or driving electronic devices such as phones, tablets, computers and the like.

The lighting system can be recharged from different power sources including from AC chargers running on home voltage, photovoltaic chargers, vehicle batteries via the vehicles' cigarette lighter jack, and the like. Preferably, the lighting system has sufficient internally stored power for lighting a home for over 36 hours on a single charge, avoiding families sitting in the dark with dangerous candle lighting only.

A significant feature of the invention is that it allows using conventional AC extension cords and bulb sockets, which are readily available in homes, to power low voltage marine style DC bulbs. The utilization of a low voltage system is more safe to use in certain circumstances, for example, where children are playing. Generally, the lighting unit provides safety, ease of use and convenience. Preferably, the system uses bright, powerful low-draw LED lights to provide illumination. It could be recharged via a house current, or the vehicle electrical systems or even a photovoltaic panel.

SUMMARY OF THE INVENTION

Accordingly, it is an object of the present invention to provide a low weight and low form factor carrying case containing the power supply and an AC style socket for connecting DC low voltage light bulbs thereto.

The foregoing and other objects of the invention are realized by a low voltage lighting apparatus, preferably comprising a housing including one or more low-voltage DC lights, one or more on/off light controllers and one or more status displays; at least one AC-style power socket plug providing thereat a DC voltage output to drive low voltage bulbs via a conventional AC extension cord; and an electrical circuit installed in the housing and including: (i) at least one rechargeable, low-voltage DC battery; (ii) a charger for charging the DC battery; (iii) one or more DC light drivers for driving the one or more DC lights; and (iv) one or more DC power outputs; wherein said one or more power outputs comprise the at least one AC style power plug.

The one or more lights preferably comprise strobe lights, and/or LED spotlights. A power output is located at a rear panel of the housing, and provided in the form of a vehicle cigarette lighter jack. The DC battery is preferably a lead acid battery.

Preferably, the housing and its internal electrical components and lights have a total weight of less than 15 pounds, and an overall volume that is less than 500 cubic inches. The internal DC battery can be recharged with a solar charger or an AC charger, with a battery charge level display indicating the charge level.

Other features and advantages of the present invention will become apparent from the following description of the invention which refers to the accompanying drawings.

BRIEF DESCRIPTION OF THE DRAWINGS

FIGS. 6*a* through 6*g* show various devices that can be used to charge the power unit of the present invention and/or to provide its DC output to drive DC lights and the like.

DETAILED DESCRIPTION OF PREFERRED EMBODIMENTS OF THE INVENTION

Figure 1:
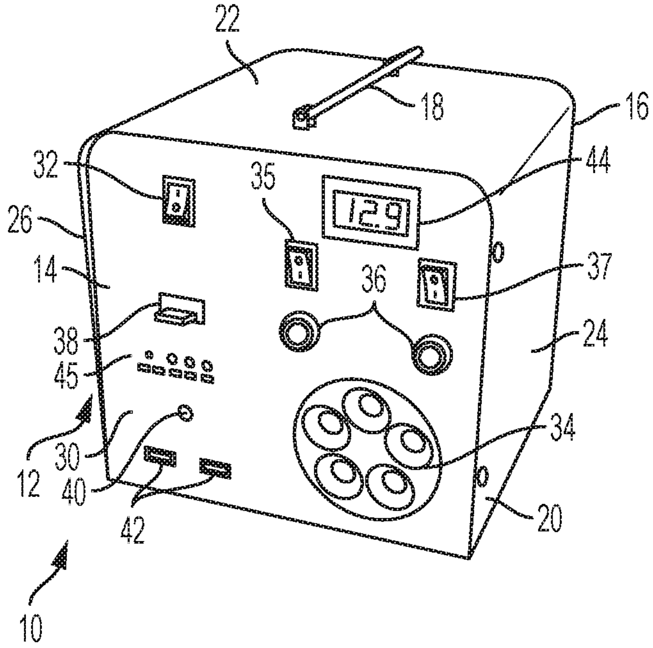
FIG. 1 is a perspective of the low voltage power unit of the present invention, showing its front panel.

Referring to the drawings, FIG. 1 illustrates the power unit 10 which essentially is a low form factor device, preferably rectangular or almost cube-shaped and preferably about 7 inches on each side and weighing not much more than 10 pounds.

The unit housing 12 comprises a front panel 14, a rear panel 16 which both extend from a base (not shown) and define an interior chamber that is closed off by a U-shaped cover housing 20 comprising a top lid 22 and side panels 24 and 26. The housing has a collapsible handle 18.

The front panel 14 includes a main, power switch 32, a strobe light bulb unit 34 and a toggle switch 35 for turning the strobe light 34 ON and OFF. A pair of spotlight LED lights 36 can be turned on and off by means of the toggle switch 37. The display 44 provides an indication of the voltage level of the internal battery. The internal battery's charge level is indicated by percentage by a series of small indicator lights 45. Drawing too much power will blow the fuse 38. At the front panel 14 are also available a pair of USB ports 42, for driving/charging phones, tablets and the like.

Figure 2:
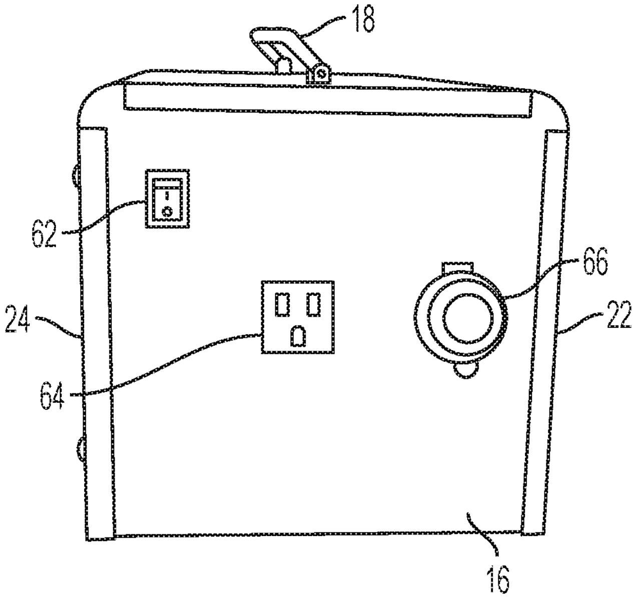
FIG. 2 is a rear view of FIG. 1.

The rear panel 16 (FIG. 2), flanked by the side panels 22, 24, supports the special DC-only output source, provided at an AC-style plug 64, which only outputs a DC voltage for driving 12 volt LED bulbs, which are conventionally available and typically used in marine applications. The output jack 66 is similar to the output jack of a cigarette lighter in vehicles. These voltages are available only when the on/off switch 62 is actuated and the purpose of these DC outputs is to drive DC bulbs that can be connected to a power cord using conventional AC extension cords.

Figure 3:
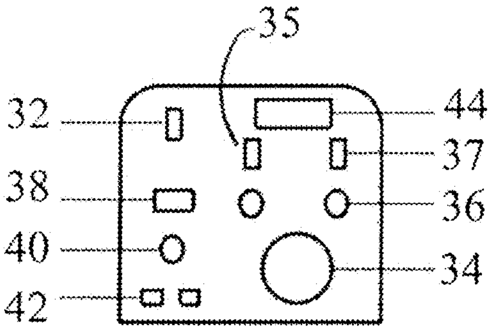
FIGS. 3 and 4 show the various control buttons, displays and outputs provided at the front panel and at the rear panel of the power unit of the present invention.
Figure 4:
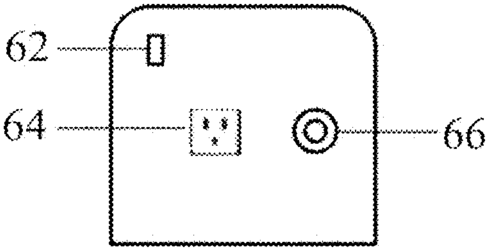

The input jack 40 on the front panel 14 (FIG. 1) can accept DC charging voltage for charging an internal battery of the power unit 10. The front and rear panels described above are illustrated in FIGS. 3 and 4 and the various switches and outlets are identified with the same reference numerals.

Figure 5:
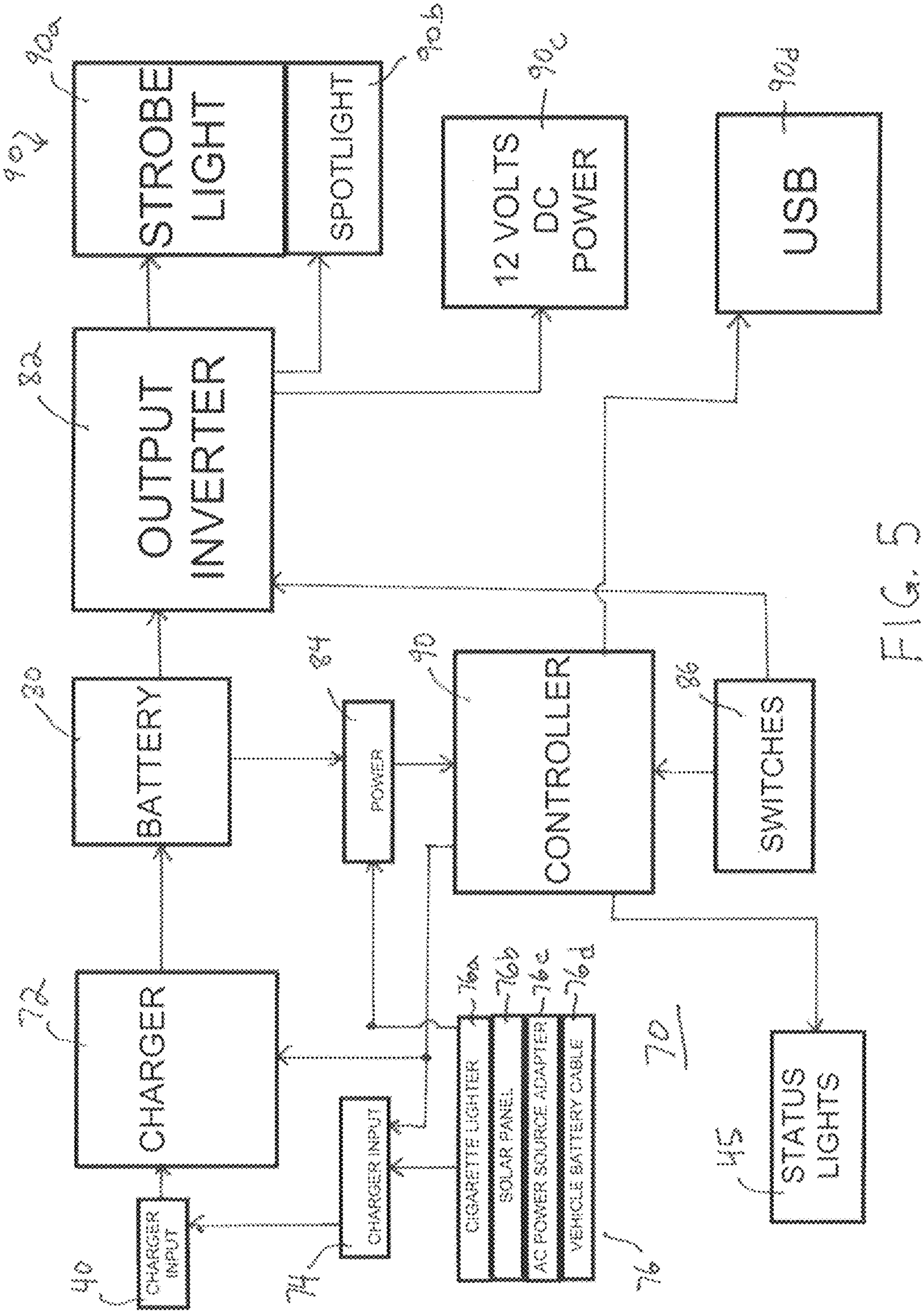
FIG. 5 is a block diagram of the internal electronics of the present invention.

Referring to FIG. 5, the major electrical and electronic system blocks of the power unit 10 of the present invention comprise a DC battery 80 that can be for example a 12 volt, 14 AH SMF lead acid battery. Naturally, other battery types may be used, for example, lithium batteries. The battery 80 may be formed of several discrete, parallel connected batteries.

The charger input 40 (FIG. 1) provides DC input voltage to a charger 72 that is coupled to the battery 80 to recharge the battery as needed. The internal power of the battery 80 can be used to drive a DC to DC power converter 84 for generating 5 volt or even lower voltage power for the controller 90, which controls the internal electronics including by receiving various switch inputs from the switch bank 86. The controller can preferably be an HT66F004 integrated circuit. It provides USB connecting signals to the pair of USB connectors 90*c*, 90*d* that are available at the front panel 16 of the power unit 10.

The battery 80 provides a power output that drives an output inverter 82,which inverter 82 delivers output light voltage 90*a*, 90*b* to drive the front panel strobe light 34 and the LED spotlight 36. The inverter 82 also provides a 12 volt DC power outlet 90*c* which is available at the rear panel 16, via the 3-prong U.S. style, conventional AC outlet 64 or via a vehicle cigarette lighter jack plug 66.

The charger input 40 receives its power through input electronics 74 that are controlled in part by the controller 90 to provide power input sources that are indicated in block format in FIG. 5 as the cigarette lighter input 76*a* (FIGS. 6*a*, 6*b*, 6*c*, etc.), a solar panel input 76*b*, an AC power source adaptor 76*c*, a vehicle battery cable 76*d* (collectively the power sources 76).

Some of the status light indicators on the front panel are provided through an interface including a status light interface 45 shown in FIG. 5.

Several of the accessories of the present invention are conventionally available in the marketplace including 12 volt, 5 watt LED bulbs, for example ones that are known as the "E27" bulbs. Another accessory is a 12 volt laptop charger that produces from AC power, a 12 volt DC voltage that can be directly inserted in the input power plug 40 of the system 10. A foldable, solar panel, 60 watt output generator is also readily available in the marketplace and usable to connect to the system 10, via the power charging plug 40, to charge/drive the internal battery 80.

Figure 6A:
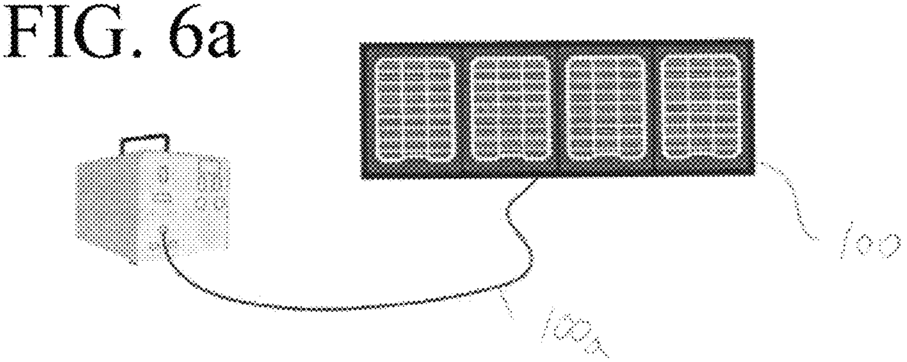
Figure 6B:
Figure 6C:
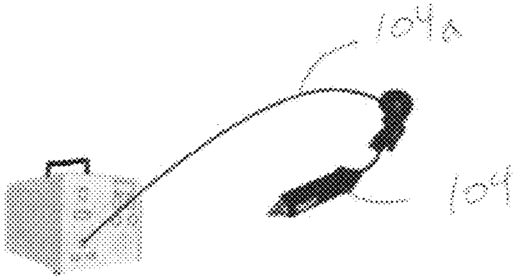
Figure 6D:
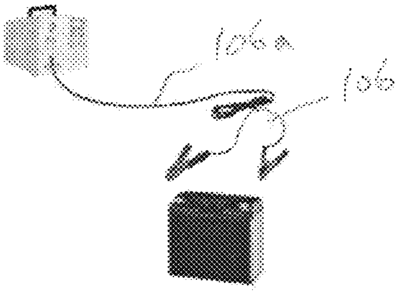
Figure 6E:
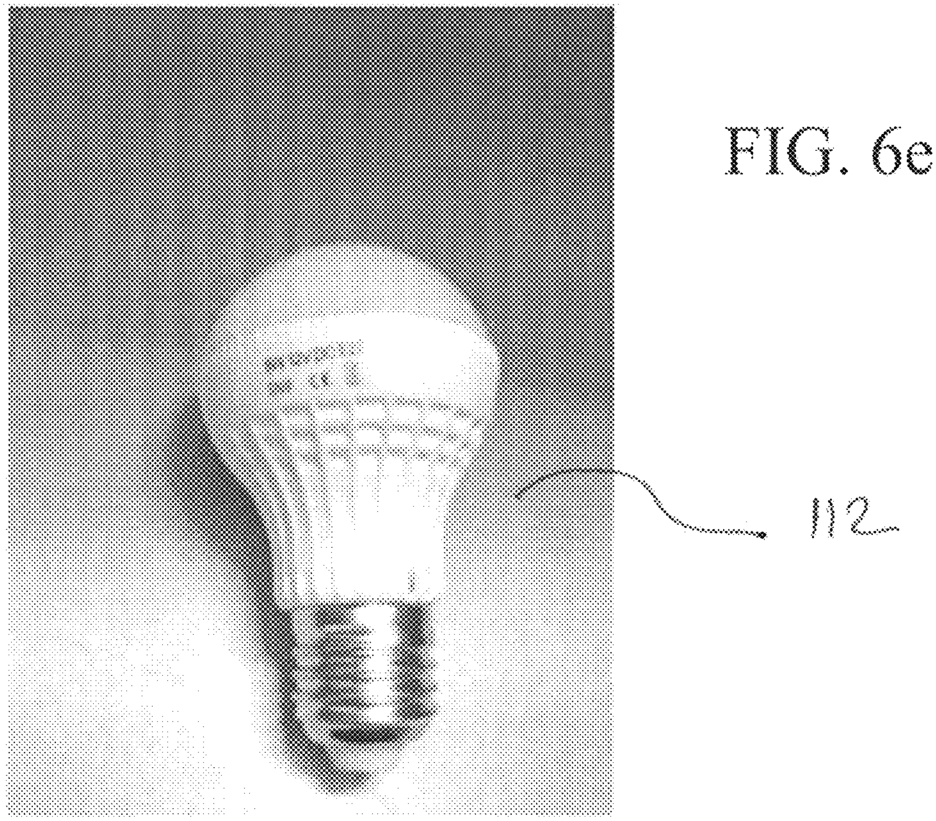
Figure 6F:
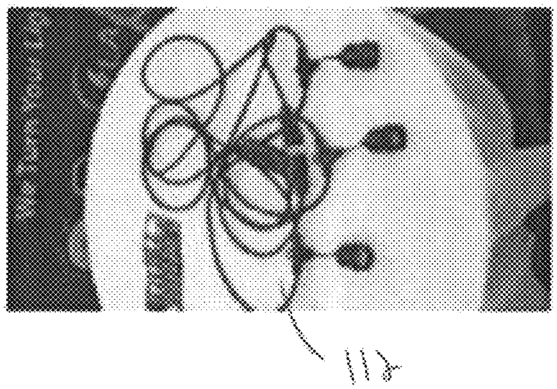
Figure 6G:
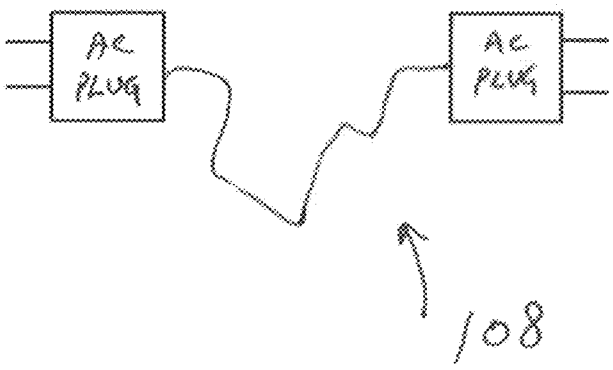

The foregoing power input and accessories are diagrammatically illustrated, including in FIG. 6*a* that shows a foldable, solar panel 100 with a power cable 100*a* that plug directly into the front panel plug 40. FIG. 6*b* shows a conventional power cord with an AC plug that can be plugged into a conventional AC plug to drive a charger 102 with a cable 102*a* to produce charging power for the unit 10. FIG. 6*c* shows a similar power charger, except that the 12 volts is generated from a plug 104 that fits into a vehicle's cigarette lighter plug and provides its power output 104 with power cable 104*a*. FIG. 6*d* shows a cable with grip leads that can be connected directly to a vehicle's battery.

As described above, the small form-factor lighting unit 10 of the present invention can provide lighting, for well over 30 hours, to drive a 12 volt DC, 5 watt lightbulb that is equivalent to a 40 watt incandescent bulb, as well as USB no-load output voltage of 3.1 volts.

Another optional use of the invention is to use a conventional AC cable with a male AC plug provided at both ends, with one of them plugged into the rear panel AC socket and the other into the household AC socket (after one is extremely careful to shut off the main AC switch into the home and also disconnect and turn off all the connecting lights, refrigerators, etc.) Or, safety features can be built-in in each plug, whereby any detection of AC house voltage electrically disconnects the plug from the house wiring. A similar technology can be located in sockets that receive the DC low voltage bulbs. Thereby, one can insert low-voltage bulbs into a kitchen area or a playroom and run them by DC power derived from the unit 10, while a power outage is occurring.

The power unit 10 can be provided with a special support mechanism that maintains the battery always charged up, by having the unit 10 slung out the window and hooked to a solar panel that maintains the battery always charged. The great facility of the invention comes from the fact that it is very portable and from its use of conventional AC power cords can be used to drive convention low voltage DC light bulbs.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A low voltage lighting apparatus, comprising:
- a housing including one or more low-voltage DC lights, one or more on/off light controllers and one or more status displays;
- at least one AC, U.S. style power socket providing thereat a DC voltage output to drive low voltage bulbs via a conventional U.S. style AC extension cord; and
- an electrical circuit installed in the housing and including:
  - i. at least one rechargeable, low-voltage DC battery;
  - ii. a charger for charging the DC battery;
  - iii. one or more DC light drivers for driving the one or more DC lights; and
  - iv. one or more DC power outputs;
- wherein said one or more DC power outputs is provided at said at least one AC, U.S. style power socket.

2. The apparatus of claim 1, wherein the one or more lights comprise strobe lights.

3. The apparatus of claim 1, wherein the one or more lights comprise LED spotlights.

4. The apparatus of claim 1, including a power output located at a rear panel of the housing, and provided in the form of a vehicle cigarette lighter jack.

5. The apparatus of claim 1, wherein the DC battery is a lead acid battery.

6. The apparatus of claim 1, wherein the housing and its internal electrical components and lights have a total weight of less than 15 pounds.

7. The apparatus of claim 1, wherein the housing has an overall volume that is less than 500 cubic inches.

8. The apparatus of claim 1 in combination with a solar charger for charging the at least one of the battery.

9. The low voltage light apparatus of claim 1, in combination with an AC charger for charging the at least one low-voltage DC battery.

10. The low voltage lighting apparatus 1, further including a battery charge level indicator.

11. A low voltage lighting apparatus, comprising:
- a housing including one or more low-voltage DC lights, one or more on/off light controllers and one or more status displays;

at least one AC, U.S. style power socket, including at least two socket holes that are rectangularly shaped and which extend parallel to one another in lengthwise directions thereof, providing thereat a DC voltage output to drive low voltage bulbs via a conventional AC extension cord; and an electrical circuit installed in the housing and including:

i. at least one rechargeable, low-voltage DC battery;

ii. a charger for charging the DC battery;

iii. one or more DC light drivers for driving the one or more DC lights; and iv. one or more DC power outputs;

wherein said one or more DC power outputs comprise said at least one AC style power plug.

* * * * *